US 8,744,807 B2

(12) United States Patent
Dejori et al.

(10) Patent No.: US 8,744,807 B2
(45) Date of Patent: Jun. 3, 2014

(54) SCALABLE AND EXTENSIBLE FRAMEWORK FOR STORING AND ANALYZING SENSOR DATA

(75) Inventors: Mathaeus Dejori, Princeton, NJ (US); Ciprian Raileanu, Jersey City, NJ (US); Nazif Cihan Tas, Lawrenceville, NJ (US); Claus Neubauer, Monmouth Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 241 days.

(21) Appl. No.: 12/781,890

(22) Filed: May 18, 2010

(65) Prior Publication Data

US 2011/0035187 A1      Feb. 10, 2011

Related U.S. Application Data

(60) Provisional application No. 61/232,593, filed on Aug. 10, 2009.

(51) Int. Cl.
*G06F 17/40* (2006.01)
*G06F 11/34* (2006.01)
*G06F 9/445* (2006.01)
*G01D 9/00* (2006.01)

(52) U.S. Cl.
CPC ........ *G06F 11/3476* (2013.01); *G06F 9/44526* (2013.01); *G01D 9/005* (2013.01)
USPC ...................................................... 702/187

(58) Field of Classification Search
CPC .................... G06F 11/3476; G06F 9/44526
USPC ........................................................ 702/187
See application file for complete search history.

(56) References Cited

U.S. PATENT DOCUMENTS

| 5,353,009 | A  | * | 10/1994 | Marsh et al. ................. 340/505 |
|-----------|-----|---|---------|---------------------------------------|
| 5,373,346 | A  | * | 12/1994 | Hocker ........................ 702/188 |
| 5,481,481 | A  | * | 1/1996  | Frey et al. ..................... 702/82 |
| 6,415,235 | B1 | * | 7/2002  | Bartholomew et al. ......... 702/28 |
| 7,203,623 | B2 | * | 4/2007  | Garcea et al. ................. 702/186 |
| 2002/0022775 | A1 | * | 2/2002 | Finkelshteins ............... 600/300 |
| 2005/0062599 | A1 | * | 3/2005 | Neubauer et al. ............ 340/506 |
| 2006/0136177 | A1 | * | 6/2006 | Patanian ...................... 702/187 |
| 2006/0173656 | A1 | * | 8/2006 | Hansen ........................ 702/188 |
| 2008/0215727 | A1 | * | 9/2008 | Denis et al. .................. 709/224 |

(Continued)

OTHER PUBLICATIONS

Posthumus, Robert, Data Logging and Monitoring for Real-Time System, University of Twente, May 2007.*

(Continued)

*Primary Examiner* — John Breene
*Assistant Examiner* — Timothy H Hwang (57) ABSTRACT

In a framework for acquiring and analyzing data from a network of sensors, plug-in software interfaces are used to provide scalability and flexibility. Data collection set-up data is exchanged through one or more first plug-in software interfaces with data collection devices, to configure the processor to collect measurement data from the data collection devices. Analysis set-up data is exchanged through one or more second plug-in software interfaces with one or more data analysis software packages, to configure the processor to provide a predefined subset of the measurement data to the data analysis software packages and to accept analysis results from the data analysis software packages. Measurement data and analysis results are subsequently exchanged through the plug-in interfaces.

26 Claims, 5 Drawing Sheets

(56) References Cited

U.S. PATENT DOCUMENTS

2008/0295074 A1* 11/2008 Schneider et al. ............ 717/120
2010/0251218 A1*  9/2010 Mahesh et al. ................ 717/127
2011/0213278 A1*  9/2011 Horak et al. .................. 600/595

OTHER PUBLICATIONS

Definition of "Accept", thefreedictionary.com, http://www.thefreedictionary.com/p/accept, Last accessed Apr. 3, 2012.*

Definition of "Particular", thefreedictionary.com, http://www.thefreedictionary.com/p/particular, Last accessed Apr. 4, 2012.*

Hua, K.A. et al., Dissemination of Sensor Data over the Internet, EUC 2005, LNCS 3207, pp. 745-754, Springer-Verlag Heidelberg 2004.*

Kim et al., "Health Monitoring of Civil Infrastructures Using Wireless Sensor Networks", IPSN '07, Apr. 25-27, 2007, Cambridge, MA.

* cited by examiner

SCALABLE AND EXTENSIBLE FRAMEWORK FOR STORING AND ANALYZING SENSOR DATA

CROSS REFERENCE TO RELATED APPLICATIONS

This application claims the benefit of U.S. Provisional Application Ser. No. 61/232,593 entitled "SensorMart: Scalable and Extensible Framework for Storing Sensor Data," filed on Aug. 10, 2009, the contents of which are hereby incorporated by reference herein in their entirety.

FIELD OF THE INVENTION

The present invention relates generally to the field of data collection, storage and analysis, and more particularly, to a scalable and flexible framework for acquiring and analyzing data.

BACKGROUND OF THE INVENTION

The decreasing cost of sensor hardware and the availability of vast communications networks have permitted monitoring the conditions of remotely located assets over a long time period, collecting enormous amounts of data. Examples of such monitoring systems abound, and include systems for monitoring the condition of transportation infrastructure including bridges, tunnels and highways, communications and power distribution infrastructure such as cables and switches, wind turbines, waterways, and equipment subsystems such as factory machines and agricultural equipment. In each case, general or special-purpose sensors produce measurement data that is collected by processors and analyzed using one or more data analysis algorithms.

Figure 1:
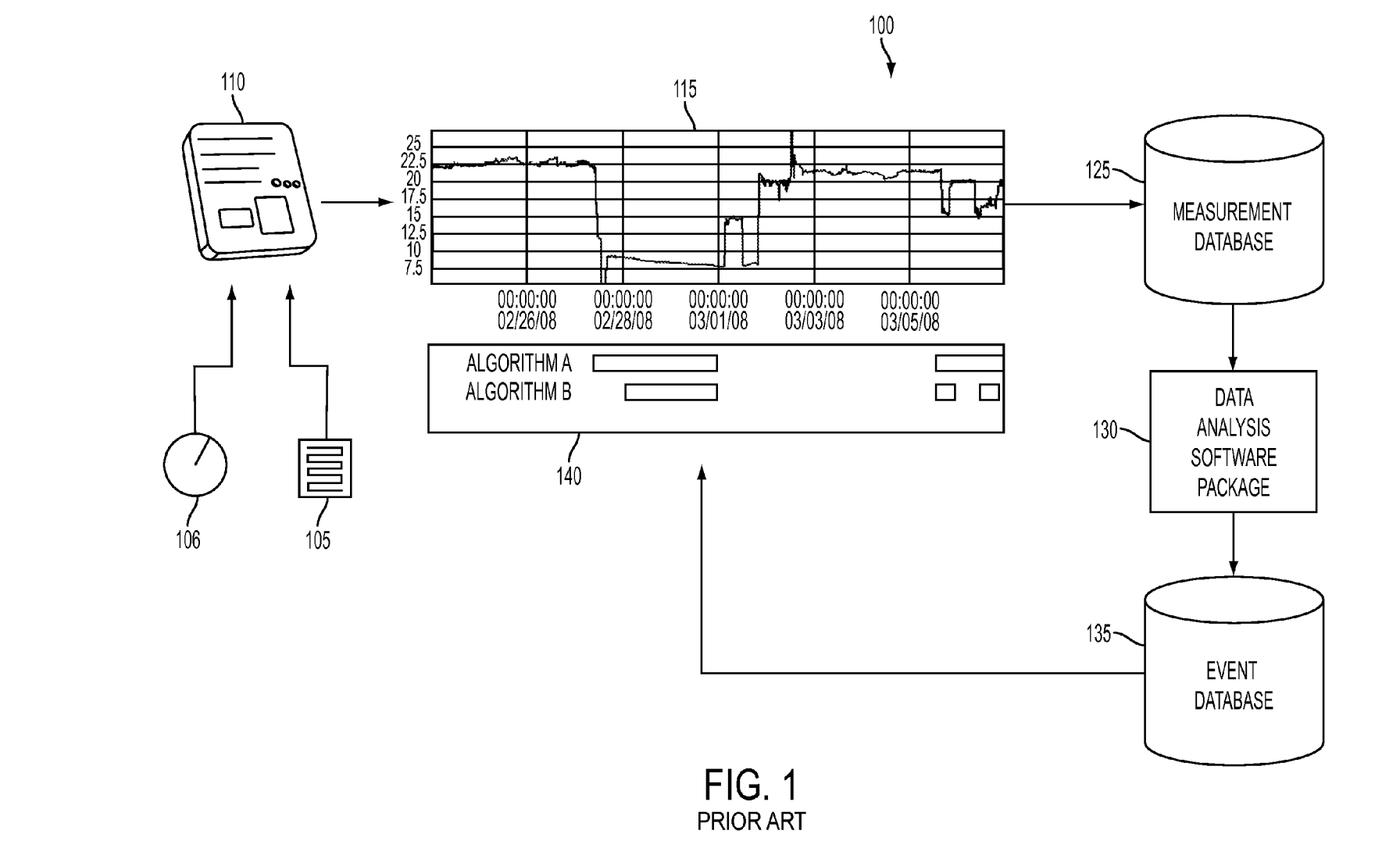
FIG. 1 is a block diagram showing a prior art data collection and analysis system.

A typical data monitoring system 100 for long-term monitoring is shown in FIG. 1. A data logger 110 is typically used to gather data from simple sensors 105, 106. As used herein, the term "sensor" means any device that performs a measurement of its environment and transmits a signal representing that measurement. Examples of sensors include distance sensors, temperature sensors, pressure sensors, strain gages, color sensors, liquid level sensors, cameras, microphones, chemical sensors, electrical sensors, speed, altitude or pitch sensors, GPS receivers, etc.

The data logger 110 may perform one or more functions on signals received from the sensors 105, 106. For example, the data logger may condition and compensate a signal for offset and gain, or may perform analog to digital conversion on a signal. The data logger may receive wireless signals from the sensors and convert them to terrestrial electrical or optical signals. The data logger may organize signals from multiple sensors and store data representing those signals in a temporary memory until the data is retrieved by a monitoring system. The data logger may associate sequential data from a sensor with timestamps to permit synchronization with data from other sources. The data logger may additionally calculate characteristics that are not directly measured by the sensors, but are instead determined by combining or compensating signals received from the sensors. The data logger typically includes a processor that may be queried by a monitoring system to retrieve stored data.

Data 115 from the data logger 110 are collected by the monitoring system 100 and stored into a measurement database 125. A system of measurement sensors such that described may generate a large volume of data; the measurement database must therefore be capable of efficiently storing and accessing such data. In practice, a column-oriented database management system architecture is frequently used.

The data may be transmitted and stored in real time as it is measured, or may be collected in small batches by the data logger and transmitted at regular time intervals or regular batch sizes to be stored by the monitoring system 100 in the database 125. The stored data may include data from multiple sensors, indexed according to a time line, or according to some other indexing variable.

The stored data 115 in the database 125 are constantly analyzed through one or more analysis methods performed by one or more data analysis software packages 130. For example, outlier detection may be performed on the data, or a state estimation model may be used to detect deviations from a normal state. Results of those analyses are then used to generate labels 140 that are indexed to the data 115. Each data analysis software package 130 or algorithm typically generates a particular set of labels 140 directed to a particular characteristic. The labels are stored in an event database 135 as events and may include indexing data such as time data or unique IDs for aligning the labels with the corresponding measurement data 115. The labels 140 annotate the data 115 by marking intervals or points in the data 115 where a certain error has been observed, a certain threshold has been exceeded, or some other event has occurred as determined by the data analysis software packages 130.

A data analysis software package 130 utilizes a particular set of data from the data logger 110. Often, that subset of data is only a small portion of the data generated by the logger over time. In a large system, the various algorithms used in the data analysis software packages 130 must parse through huge amounts of data generated by the data loggers to retrieve the data that is useful to a particular algorithm.

The monitoring system 100 is often deployed in a long-term setting IT framework that supports long-term monitoring. In those cases, it is desirable that the system be flexible enough to adapt over time to newly available sensing and logging technologies and new equipment models and vendors. The system should also adapt to new algorithmic developments. Currently available IT frameworks are vendor specific and not open for collecting data from sensing hardware of different providers. The frameworks are furthermore not sufficiently flexible to connect to sensing technologies not seen so far. In addition, existing frameworks only allow the creation of very basic algorithms such as rule-based or fuzzy logic-based methods and are not open to the integration of more sophisticated custom-made algorithms.

There is presently a need to overcome the above described limitations of existing IT solutions by facilitating the integration of a variety of different sensor types and data analysis methods. There is furthermore a need for the capability to extend the capabilities of a measurement system to function with new sensor inputs and new data analysis algorithms.

SUMMARY OF THE INVENTION

The present invention addresses the needs described above by providing a method for collecting and processing data. In a processor, data collection set-up data is exchanged through a first plug-in software interface with a data collection device to configure the processor to collect measurement data from the data collection device. Measurement data is then collected from the data collection device. In the processor, analysis set-up data is also exchanged through a second plug-in software interface with a data analysis software package to configure the processor to provide a predefined subset of the measurement data to the data analysis software package and to accept analysis results from the data analysis software package. The predefined subset of the measurement data is then providing to the data analysis software package for analysis.

Analysis results from the data analysis software package are then accepted and the measurement data is annotated with the analysis results.

In another embodiment of the invention, a non-transitory computer-usable medium has computer readable instructions stored thereon for execution by a processor to perform a method as described above.

DESCRIPTION OF THE INVENTION

Figure 2:
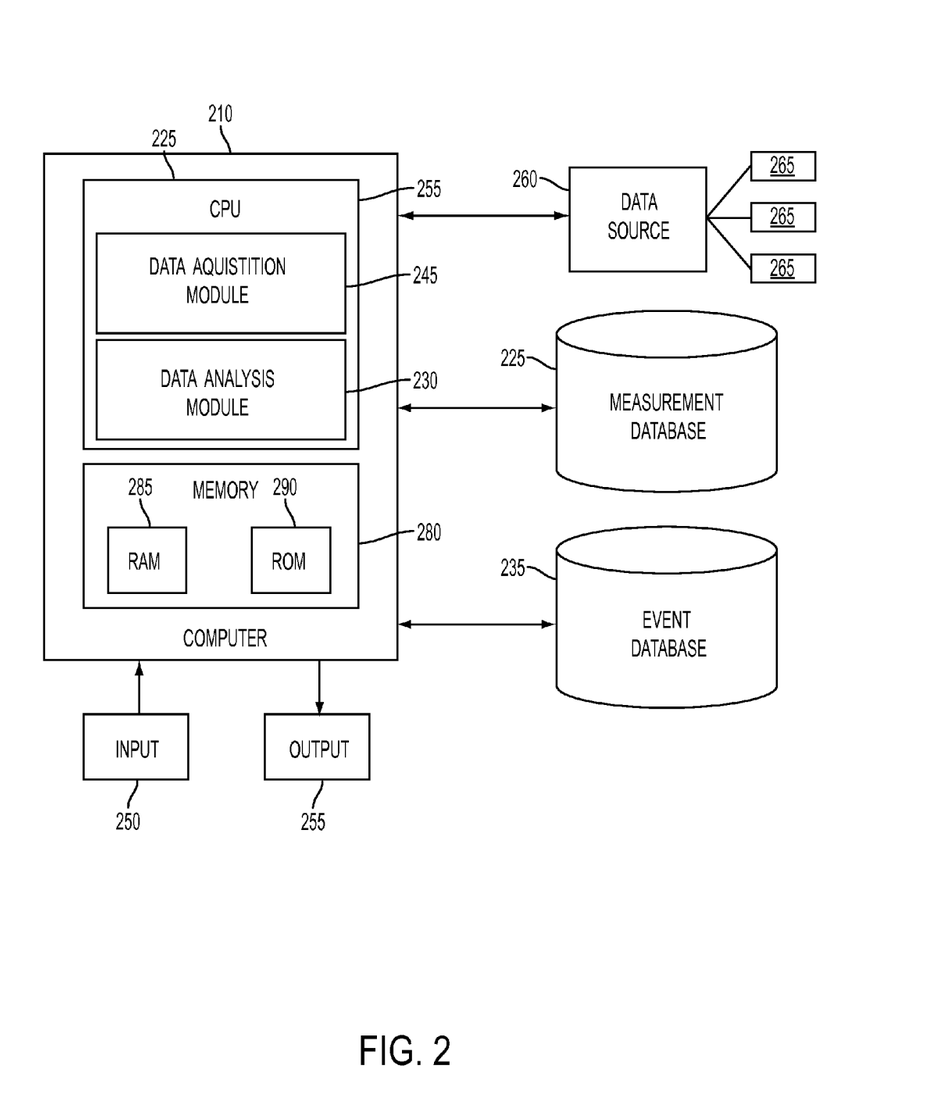
FIG. 2 is schematic illustration of a computer system for executing a method in accordance with the invention.

A system 200 for collecting and processing data according to an exemplary embodiment of the present invention is illustrated in FIG. 2. In the system 200, a computer 210 performs steps of the disclosed method. While a single computer 210 is shown, one skilled in the art will recognize that the disclosed steps may be performed by a plurality of computers linked by a network or a bus.

The computer 210 receives data from a plurality of sensors 265 that may be connected to the computer through one or more data sources 260 such as data loggers. The sensors 265 are arranged to acquire data representing time-related characteristics of a system. The sensor data is stored in a measurement database 225 along with timestamps or other temporal identifiers or indexes.

The computer 210, which may be a portable or laptop computer or a mainframe or other computer configuration, includes a central processing unit (CPU) 225 and a memory 280. The computer 210 is connected to an input device 250 and an output device 255. The CPU 225 includes one or more data acquisition modules 245 that are configured for performing one or more methods for monitoring, collecting and storing sensor data as discussed herein.

The CPU additionally contains one or more data analysis modules 230 containing algorithms for analyzing data collected from the sensors 265. The data analysis modules may be modules created by a third party for general use in sensor data analysis, or may be created specifically for the present system. The data analysis modules 230 determine the occurrence of events that may be indexed and stored in an event database 235.

The memory 280 includes a random access memory (RAM) 285 and a read-only memory (ROM) 290. The memory 280 may also include removable media such as a disk drive, tape drive, etc., or a combination thereof. The RAM 285 functions as a data memory that stores data used during execution of programs in the CPU 225 and is used as a work area. The ROM 290 functions as a program memory for storing a program executed in the CPU 225. The program may reside on the ROM 290 or on any other non-volatile computer-usable medium as computer readable instructions stored thereon for execution by the CPU 225 or other processor to perform the methods of the invention. The ROM 290 may also contain data for use by other programs.

The input 250 may be a keyboard, mouse, network interface, etc., and the output 255 may be a liquid crystal display (LCD), cathode ray tube (CRT) display, printer, etc. The computer 210 may be connected to a network, with all commands, input/output and data being passed via the network. The computer 210 can be configured to operate and display information by using, e.g., the input 250 and output 255 devices to execute certain tasks.

Figure 3:
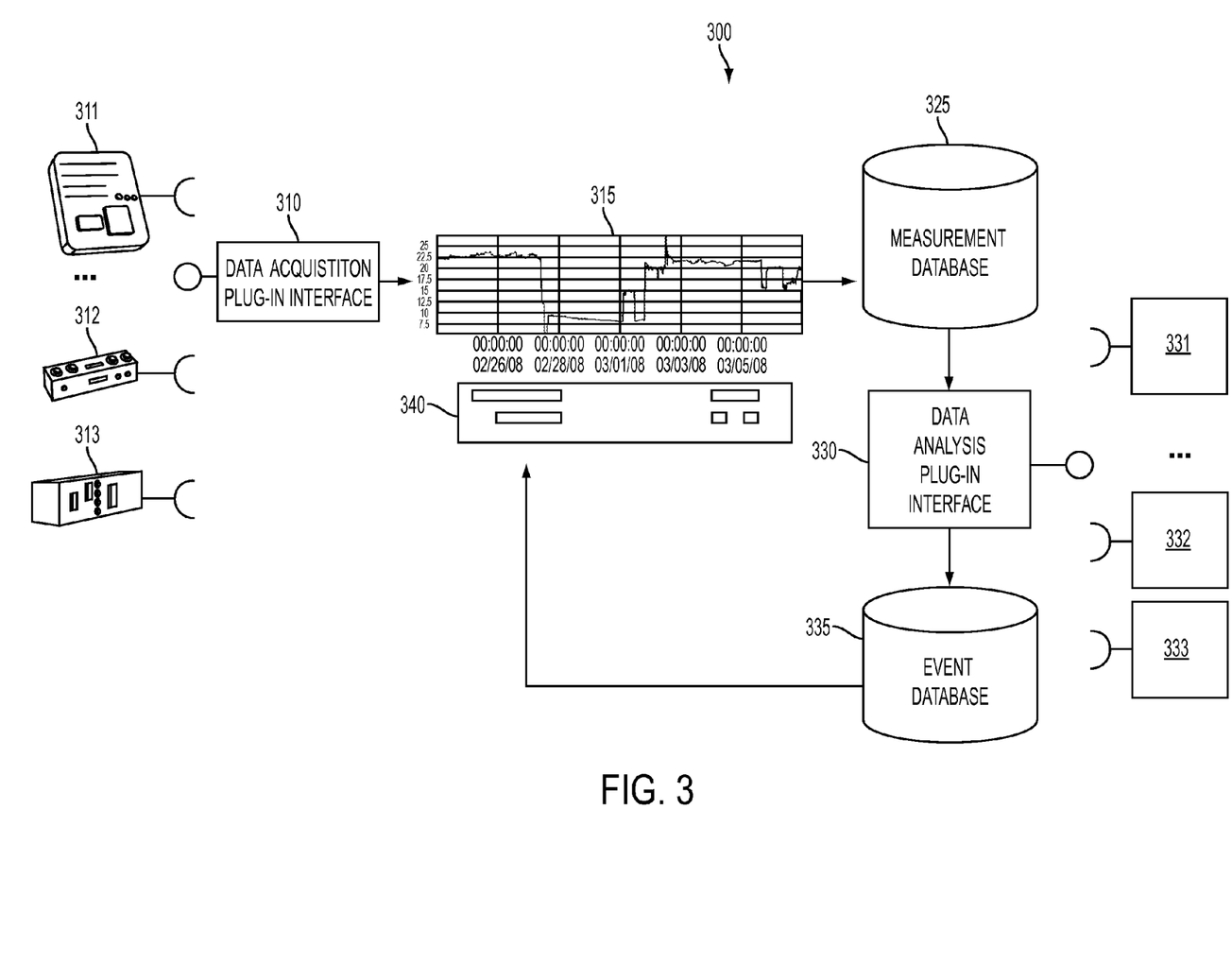
FIG. 3 is a block diagram showing a data collection and analysis system according to one embodiment of the invention.

Presently disclosed is architecture of a system 300, shown in FIG. 3, that overcomes the limitations of current frameworks discussed above. To provide increased system flexibility and adaptability, two plug-in interfaces are provided: a data acquisition plug-in interface 310 and a data analysis plug-in interface 330. Those plug-in interfaces are interconnected as described below. Databases 325, 335 are provided for storing measurement data and events, respectively. A user interface including a data display 315 and event labeling 340 are also provided through the events framework.

The plug-in interface 310 on the data acquisition side of the system 300 provides a flexible and easily extendible data gathering mechanism. The interface 310 supports fetching data from data sources 311, 312, 313. Data sources are devices or locations that acquire and/or temporarily store measurement data. The data sources are frequently vendor-specific, such as vendor-specific data loggers that interface with sensors. The data sources acquire raw, in-field measurement data, condition and combine the measurement data, and store the results for later batch retrieval. The interface 310 connects to those diverse data sources 311, 312, 313 as described below, and transfers the data to the presently-described system.

The plug-in interface 310 facilitates adding new data sources to the system. Preferably, the data acquisition plug-in interface 310 comprises an application programming interface (API) that provides a standard interface, allowing third party data source designers to create code for data sources having a plug-in feature that interacts with the host application in the interface 310. It is contemplated that manufacturers of data loggers and other data sources may agree on such an interfacing standard, making the coding of an adapter unnecessary for introducing new data sources. Data sources may furthermore incorporate a plug-and-play-type feature to facilitate the discovery of the data source hardware component in the system, without the need for physical device configuration, or user intervention.

Alternatively, if a data source to be added to the system has no provision for using an API and has previously not been used with the system, then a simple adapter is written for defining the necessary components and for translating data formats, data types and commands. The adapter permits exchanges between a particular data source type and the plug-in interface 310. Once an adapter is written for a particular data source type, no additional special code need be written for later uses of that data source type.

A new data source is registered with the system through a protocol including several commands. The following are examples of commands that may be used to register a new data source:

connect( ) passes initial details necessary for a connection to be established between the data sources 311, 312, 313 and the data acquisition plug-in interface 310. Those details may include an initial handshaking protocol for physically establishing a communications channel.

disconnect( ) tears down a previously-established channel between a data source and the data acquisition plug-in interface.

getSensors( ) is transmitted to the data source to request a list of sensors connected to that data source. In response to the getSensors( ) command, the data source sends a table including information about each sensor connected to the data source. That information may include, for example, a sensor identifier, a sensor hardware type, a sensor location, sensor measurement units and a sensor data format.

setReadingInterval( ) The data acquisition plug-in interface 310 supports the periodic uploading of data from the data sources. The setReadingInterval( ) command defines a time interval between transfers of data from a particular data source to the data acquisition plug-in interface 310. In one example, a setReadingInterval( ) command is sent from the interface 310 to a data logger 311. The command includes arguments establishing a time period between data uploads. Thereafter, as each time interval equal to the time period elapses, the data logger collects data from all sensors identified in previous the getSensors( ) command, and transmits the collected data to the data acquisition plug-in interface 310. A corresponding getReadingInterval( ) command may be used to check the interval currently in use by the data source.

Thus, different types of data sources from different vendors can coexist and run efficiently in the presently described infrastructure. The plug-in features of the system enable third-party data source developers to create unique capabilities for their devices without the need to specifically integrate those capabilities into a data monitoring and acquisition system such as that presently described. The size and complexity of the data monitoring and acquisition system is maintained at a manageable level while permitting data source capabilities to be expanded. Because the two systems remain separate, problems with incompatible software licenses are reduced.

The data analysis plug-in interface 330 depicted on the right hand side of FIG. 3 enables users to conveniently plug customized data analysis tools 331, 332, 333 into the system, thus extending the algorithmic power of the system without changing the underlying framework or code base. As with the data source plug-in interface 310, the data analysis plug-in interface 330 facilitates adding new units to the system. An API provides a standard interface, allowing third party data analysis package designers to create code that interacts with the host application in the interface 330.

The customized data analysis tools contemplated by the present disclosure may perform a broad variety of tasks. General purpose tools may perform statistical analysis on time series data, including the calculation of data trends, the detection of anomalies and abnormal conditions, and the production of summary data for storage.

Specialized tools may be created specifically for certain types of data. For example, a data analysis tool for weather data may receive data from certain sensors at geographically distributed stations, and make weather predictions and prepare summaries for archiving based on that data. A data analysis tool for structural analysis may receive data from strain gages located throughout a structure, and calculate stress estimates based on those readings.

A new data analysis package may be registered with the system through a protocol including several commands. The following are examples of commands that may be used to register a new data analysis software package:

subscribe( ) identifies data that is to be transmitted to the data analysis software package. The command may, for example, contain arguments identifying the data by sensor type, by data type, by the time the data was acquired, by the identity of the data source from which the data comes, or by the locations of the sensors of interest. If a data analysis package 331 subscribes to data of a certain type, or data from a certain type of sensor, then all available data fitting that description is sent by the data monitoring system 300 to the analysis package 331 as it becomes available. By subscribing only to data that is of interest in performing the needed calculations, a data analysis software package avoids the necessity of parsing through the huge amounts of data that are otherwise available from the system.

unsubscribe( ) removes that data identified in the arguments from the subscription list.

consume( ) triggers the data monitoring system to transmit all data identified in previous subscribe( ) commands (minus data identified in unsubscribe( ) commands) to the sending data analysis package.

Using the presently described infrastructure, each of the data analysis components 331, 332, 333 receives only a predefined subset of the measurement data. Specifically, the data analysis components receive only the data they are interested in (i.e., "subscribed" to), thus the quantity of data to be analyzed is reduced significantly. As noted above, the data analysis components may define the subscribed data in several ways. In one example, the subscribe( ) command defines a data type, such as "all temperature data," in a system that monitors weather. In that case, all temperature data produced by the sensors in the system will be transmitted to the requesting data analysis component. The data analysis component may use all received temperature data, or may filter the data according to parameters such as location, time or measuring sensor, using only a portion of the data received.

In another example, a data analysis component may define data from particular data sources identified in the subscribe( ) command. That may be the case for specialized algorithms designed to identify events that are uniquely associated with a specific set of sensors.

With the above-described infrastructure, users can easily register the components to be implemented in the system, including data sources and data analysis packages.

Figure 4:
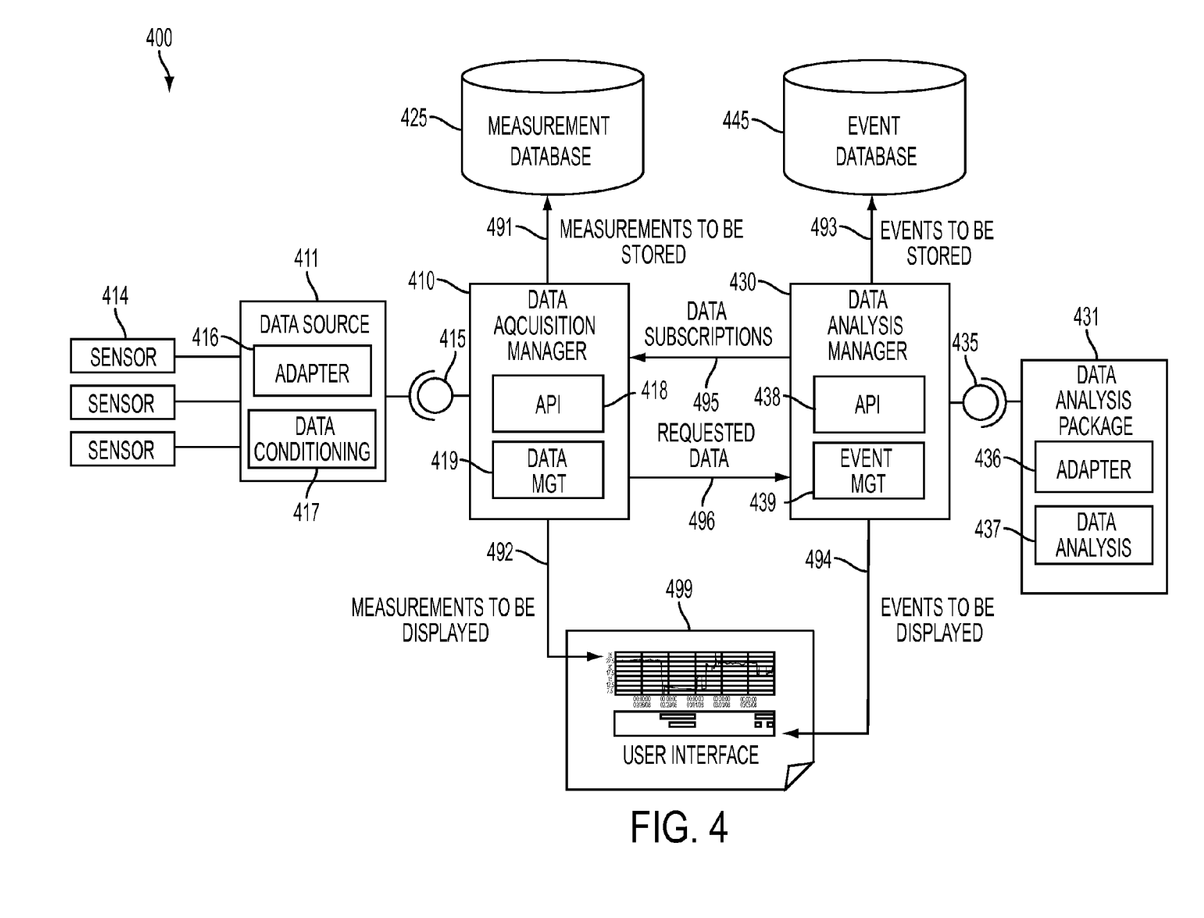
FIG. 4 is a block diagram illustrating data flow in a data collection and analysis system according to one embodiment of the invention.

The flow of data in the system of the invention is illustrated in a functional block diagram of the system 400 shown in FIG. 4. Data from sensors 414 is gathered by a data source 411 such as a data logger. The data is conditioned, combined and otherwise prepared by modules of the data source 411 such as the data conditioning module 417.

The data source 411 communicates with a data acquisition manager 410 of the system through a pluggable interface 415. While the pluggable interface 415 may be implemented in a number of ways, one technique is to define an API 418 in the data acquisition manager 410, and provide an adapter 416 implementing the API in the data source 411. In object oriented languages, for example, the adapter code 416 of the data source 411 implements a set of class definitions set forth in the API 418 of the data acquisition manager 410. The definitions describe how objects, derived from a particular class, will behave in a given circumstance. Other data sources 411 may then easily be added by adding code implementing the API 418 of the data acquisition manager 410.

As described above, at intervals the data acquisition manager 410 receives all available data from the data source 411 through the plug-in interface 415. The data acquisition manager may be connected to a large number of data sources which may, in turn, be connected to large numbers of sensors.

The potentially large volume of data transmitted to the data acquisition manager is handled, for example, using a rule-based filter residing in a data management module 419.

Requested measurement data 496 that is subscribed to by one or more data analysis packages 431 through data subscriptions 495, as described above, is transmitted to a data analysis manager 430 for distribution to the subscribing data analysis package(s) 431. Other measurement data 491 may be identified for archiving in a measurement database 425. For example, weather summary data may be stored in the database 425 for future retrieval.

Other measurement data 492 may be identified as data to be displayed in a user interface 499 together with events 494 determined by various data analysis packages 431 connected to the data analysis manager 430. The user interface 499 provides real-time information to operators of the system. For example, the user interface may indicate events such as outliers or state changes in the data, or may identify predefined occurrences such as the attainment of a goal.

Rules defining which data is stored in the measurement database 425, which data is displayed in the user interface 499 and which data is forwarded to the data analysis manager 430 may be stored in the data management module 419. Rules for routing the data may depend on the data type and/or the type of source from which the data is received, as well as on whether the data is used by one or more of the data analysis packages 431, as defined by the subscribe( ) commands. Measurement data from a particular data source may be transmitted by the data acquisition manager 410 to each of the measurement database 425, the user interface 499 and the data analysis manager 430, to any combination or subset of the three, or to none. In the case where no data from a particular data source is to be routed to any of measurement database 425, the user interface 499 or the data analysis manager 430, the data acquisition manager 410 may close the connection with that data source.

As described above, the data analysis manager 430 is connected through one or more plug-in interfaces 435 to one or more data analysis packages 431. Each data analysis package may have adapter code 436 implementing an API 438 defined in the data analysis manager 430. A data analysis module 437 in each data analysis package 431 calculates events from data received through the plug-in interface 435.

An event manager 439 distributes events received from the data analysis packages 431 to an event database 445 and to the user interface 499. The event manager 439 may contain rules for determining events 494 to be displayed and events 493 to be stored, based on event types or based on manual input through the user interface 499.

Figure 5:
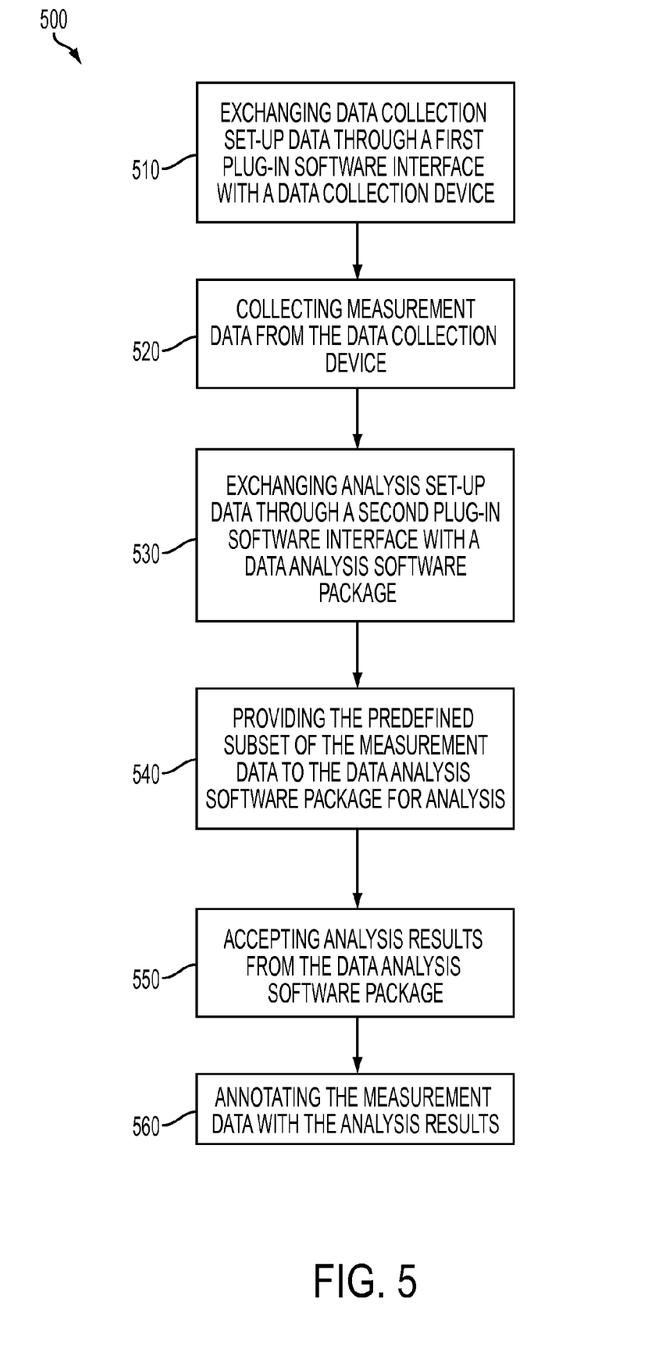
FIG. 5 is a flow chart showing a data collection and analysis method according to one embodiment of the invention.

A method 500 for collecting and processing data in accordance with one embodiment of the invention, shown in FIG. 5, may be executed by a processor in communication with the various components described above. Data collection set-up data is initially exchanged 510 through a first plug-in software interface. The data is exchanged with a data collection device to configure the processor to collect measurement data from the data collection device. Measurement data is thereafter collected 520 from the data collection device.

Analysis set-up data is exchanged 530 through a second plug-in software interface with a data analysis software package. The analysis set-up data is used to configure the processor to provide a predefined subset of the measurement data to the data analysis software package and to accept analysis results from the data analysis software package.

The predefined subset of the measurement data is provided 540 to the data analysis software package for analysis. Analysis results from the data analysis software package are accepted 550 and the measurement data is annotated 560 with those analysis results.

The presently described method and system may also implement an efficient pull-based user notification mechanism for users that initiate an interest in a particular pattern of measurement data. Using this notification mechanism, the users are only notified when their interest pattern occurs in the incoming data. In such a system, network usage and data transfer is minimized and the processing load is shifted onto the powerful servers rather than the users, enabling the users to use thin clients such as PDAs, etc.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, the techniques described herein may be applied to any repository of temporal data, including, for example, machine or process condition monitoring, structural health monitoring, transportation or other infrastructure monitoring, etc., while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A method for collecting and processing data, comprising:

in a processor, exchanging data collection set-up data through a data collection plug-in software interface with a data collection device to configure the processor to collect measurement data from the data collection device;

collecting measurement data from the data collection device;

in the processor, receiving, by a data analysis set-up data through first and second data analysis plug-in software interfaces from first and second data analysis software packages, the analysis set-up data from the first data analysis software package defining a first predefined subset of the measurement data to be provided through the first data analysis plug-in interface to the first data analysis software package, the analysis set-up data from the second data analysis software package defining a second predefined subset of the measurement data different from the first subset to be provided through the second data analysis plug-in interface to the second data analysis software package;

based on the analysis set-up data received through first and second data analysis plug-in software interfaces from first and second data analysis software packages, configuring the data analysis manager module to provide only the predefined subsets of the measurement data to the data analysis software packages through the data analysis plug-in interfaces for analysis and to accept analysis results from the data analysis software packages;

providing only the predefined subsets of the measurement data to the data analysis software packages through the data analysis plug-in interfaces for analysis;

accepting analysis results of analyses of the predefined subsets of data from the data analysis software packages through the data analysis plug-in interfaces; and annotating the measurement data with the analysis results.

2. The method of claim 1, wherein the data collection device comprises a data logger configured to receive data from at least one measurement sensor.

3. The method of claim 2, wherein:
the measurement data includes data from a plurality of measurement sensors; and
receiving analysis set-up data includes exchanging a command for identifying measurement data from at least one particular sensor for analysis by one of the data analysis software packages.

4. The method of claim 2, wherein:
the measurement data includes data from a plurality of types of measurement sensors; and
receiving analysis set-up data includes exchanging a command for identifying measurement data from at least one particular type of sensor for analysis by one of the data analysis software packages.

5. The method of claim 2, wherein:
the measurement data includes data from a plurality of measurement sensors; and
exchanging data collection set-up data includes exchanging a command for identifying the measurement sensors connected to the data logger.

6. The method of claim 1, wherein:
the measurement data includes data from a plurality of measurement sensors; and
exchanging data collection set-up data includes exchanging a command for setting a time interval between collections of measurement data for at least one of the plurality of measurement sensors.

7. The method of claim 1, wherein at least one data analysis software package comprises an outlier detection function.

8. The method of claim 1, wherein at least one data analysis software package comprises a state estimation model.

9. The method of claim 1, wherein:
annotating the data in the measurement database with analysis results further comprises providing a separate annotation for each data analysis software package.

10. The method of claim 1, further comprising
storing at least a portion of the measurement data in a measurement database.

11. The method of claim 1, further comprising
storing at least a portion of the analysis results in an event database.

12. The method of claim 1, wherein the data collection set-up data comprises a set of class definitions set forth in an application programming interface (API) of the first plug-in interface.

13. The method of claim 1, wherein the analysis set-up data comprises a set of class definitions set forth in an application programming interface (API) of the second plug-in interface.

14. A non-transitory computer-usable medium having computer readable instructions stored thereon, the instructions, when executed by a processor, causing the processor to perform operations for collecting and processing data, comprising:
exchanging data collection set-up data through a data collection plug-in software interface with a data collection device to configure the processor to collect measurement data from the data collection device;
collecting measurement data from the data collection device;
receiving analysis set-up data through first and second data analysis plug-in software interfaces from first and second data analysis software packages, the analysis set-up data from the first data analysis software package defining a first predefined subset of the measurement data to be provided through the first data analysis plug-in interface to the first data analysis software package, the analysis set-up data from the second data analysis software package defining a second predefined subset of the measurement data different from the first subset to be provided through the second data analysis plug-in interface to the second data analysis software package, the analysis set-up data further configuring the processor to accept analysis results from the data analysis software packages;
in response to receiving the analysis set-up data through first and second data analysis plug-in software interfaces from first and second data analysis software packages, configuring the processor to provide only the predefined subsets of the measurement data to the data analysis software packages through the data analysis plug-in interfaces for analysis and to accept analysis results from the data analysis software packages;
providing only the predefined subsets of the measurement data to the data analysis software packages through the data analysis plug-in interfaces for analysis;
accepting analysis results of analyses of the predefined subsets of data from the data analysis software packages through the data analysis plug-in interfaces; and
annotating the measurement data with the analysis results.

15. The non-transitory computer-usable medium of claim 14, wherein the data collection device comprises a data logger configured to receive data from at least one measurement sensor.

16. The non-transitory computer-usable medium of claim 15, wherein:
the measurement data includes data from a plurality of measurement sensors; and
receiving analysis set-up data includes exchanging a command for identifying measurement data from at least one particular sensor for analysis by one of the data analysis software packages.

17. The non-transitory computer-usable medium of claim 15, wherein:
the measurement data includes data from a plurality of types of measurement sensors; and
receiving analysis set-up data includes exchanging a command for identifying measurement data from at least one particular type of sensor for analysis by one of the data analysis software package.

18. The non-transitory computer-usable medium of claim 15, wherein:
the measurement data includes data from a plurality of measurement sensors; and
exchanging data collection set-up data includes exchanging a command for identifying the measurement sensors connected to the data logger.

19. The non-transitory computer-usable medium of claim 14, wherein:
the measurement data includes data from a plurality of measurement sensors; and
exchanging data collection set-up data includes exchanging a command for setting a time interval between collections of measurement data for at least one of the plurality of measurement sensors.

20. The non-transitory computer-usable medium of claim 14, wherein at least one data analysis software package comprises an outlier detection function.

21. The non-transitory computer-usable medium of claim 14, wherein at least one data analysis software package comprises a state estimation model.

22. The non-transitory computer-usable medium of claim 14, wherein:
   annotating the data in the measurement database with analysis results further comprises providing a separate annotation for each data analysis software package.

23. The non-transitory computer-usable medium of claim 14, wherein the method further comprises:
   storing at least a portion of the measurement data in a measurement database.

24. The non-transitory computer-usable medium of claim 14, wherein the method further comprises:
   storing at least a portion of the analysis results in an event database.

25. The non-transitory computer-usable medium of claim 14, wherein the data collection set-up data comprises a set of class definitions set forth in an application programming interface (API) of the first plug-in interface.

26. The non-transitory computer-usable medium of claim 14, wherein the analysis set-up data comprises a set of class definitions set forth in an application programming interface (API) of the second plug-in interface.

* * * * *